A. S. ERQUHART & C. DUCLOS.
MEAT SAW.
APPLICATION FILED FEB. 24, 1911.
1,089,192.
Patented Mar. 3, 1914.
2 SHEETS—SHEET 1.
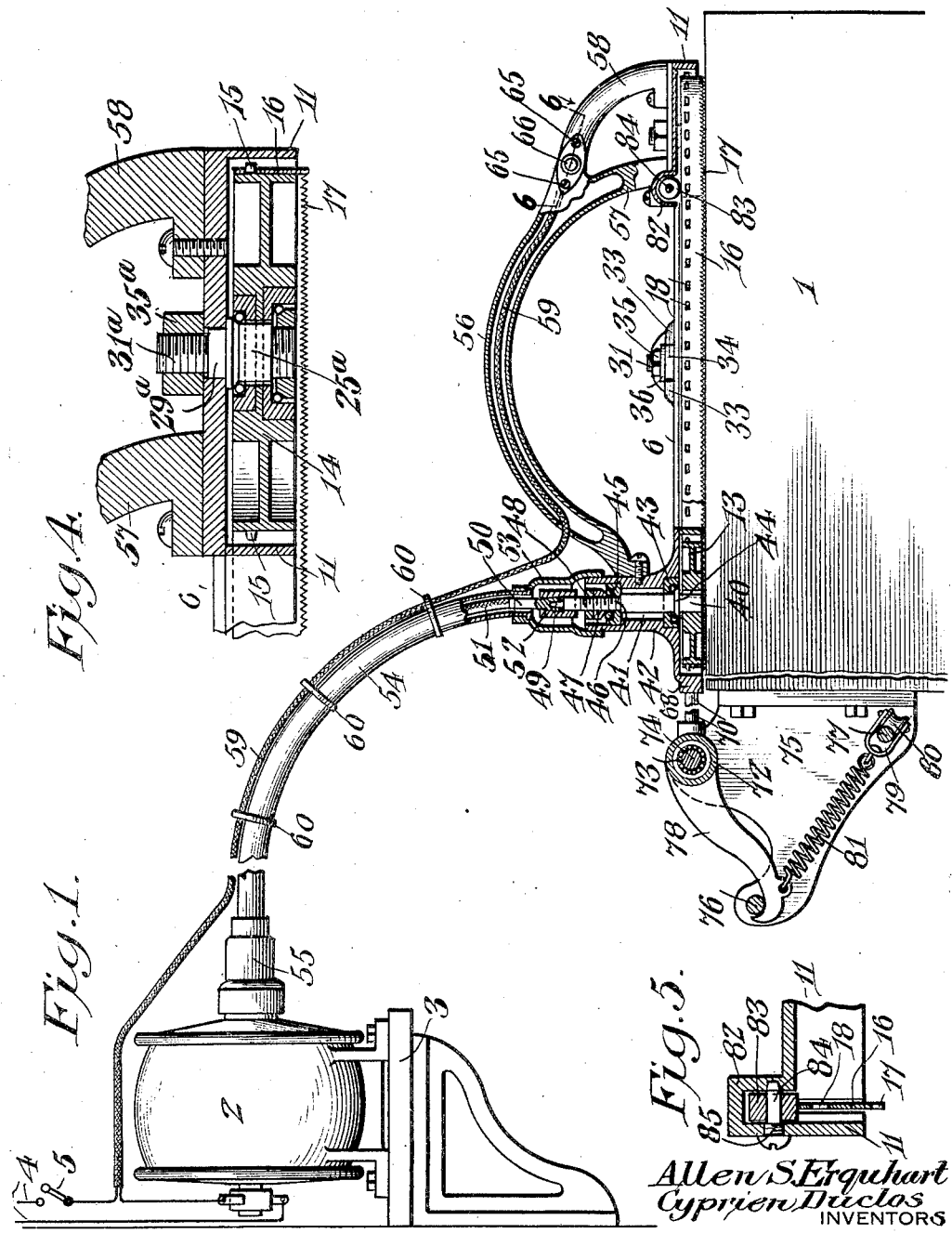
Allen S. Erquhart
Cyprien Duclos
INVENTORS

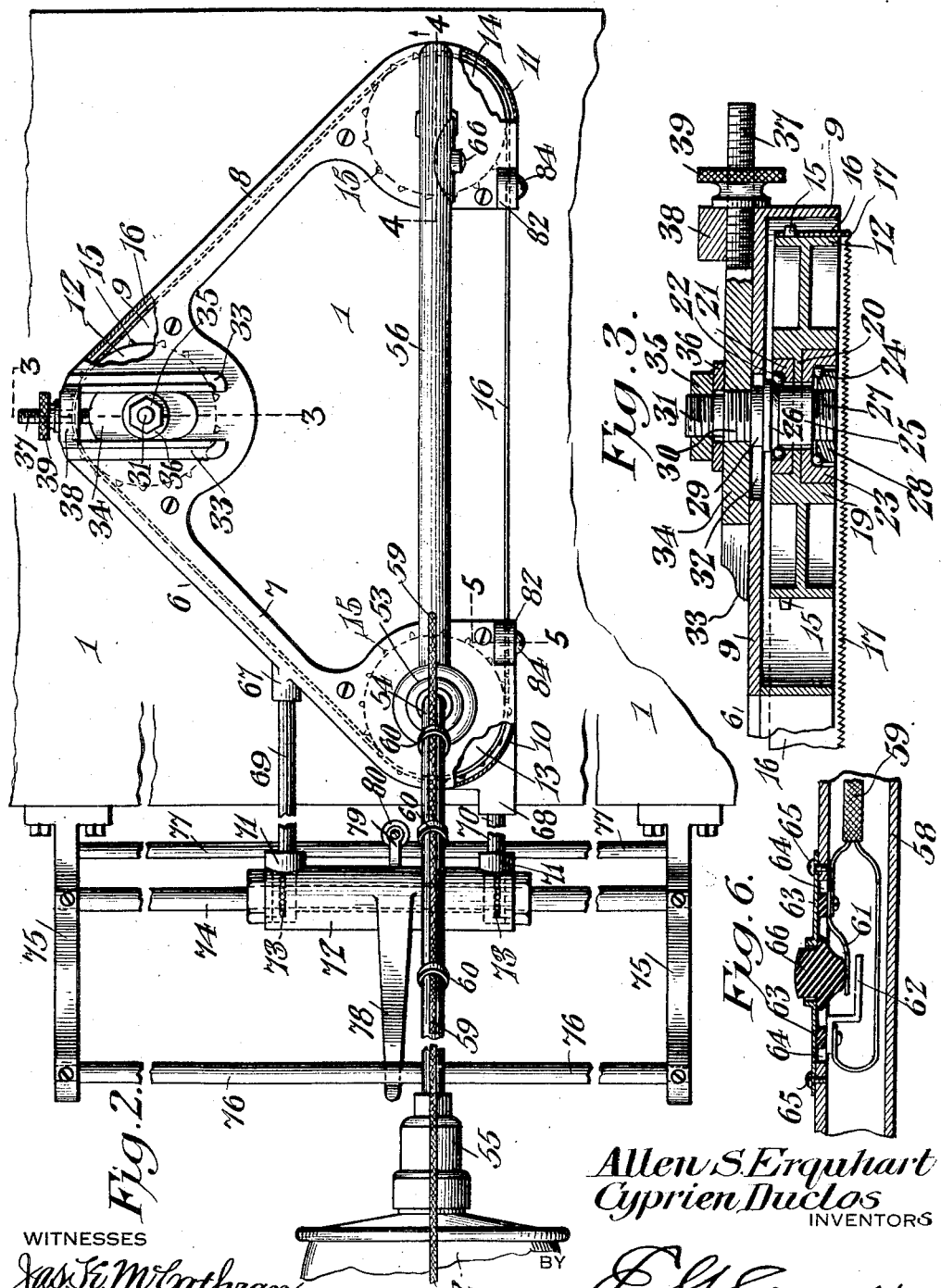

UNITED STATES PATENT OFFICE.

ALLEN S. ERQUHART AND CYPRIEN DUCLOS, OF COALINGA, CALIFORNIA.

MEAT-SAW.

1,089,192.  Specification of Letters Patent.  Patented Mar. 3, 1914.

Application filed February 24, 1911. Serial No. 610,656.

*To all whom it may concern:*

Be it known that we, ALLEN S. ERQUHART and CYPRIEN DUCLOS, citizens of the United States, residing at Coalinga, in the county of Fresno and State of California, have invented a new and useful Meat-Saw, of which the following is a specification.

This invention has reference to improvements in meat saws, and its object is to provide a power driven saw blade especially useful in shops where meat is retailed and so constructed that it may be moved to any point along a meat block for use wherever a saw is needed in the cutting of meat, and when not needed the saw automatically moves out of the way and the motor circuit is broken, so that the saw ceases to run.

The invention will be best understood from a consideration of the following detailed description, taken in connection with the accompanying drawings forming a part of this specification, with the understanding, however, that while the drawings show a practical form of the invention, it is susceptible of other embodiments and, therefore, the invention is not limited to the exact embodiment shown, but may be modified in various details without departing from the salient features of the invention.

In the drawings:—Figure 1 is a view partly in side elevation and partly in vertical section of a meat saw constructed in accordance with the present invention and in position against a meat block. Fig. 2 is a plan view of the structure shown in Fig. 1. Fig. 3 is a section on the line 3—3 of Fig. 2 but drawn on a larger scale. Fig. 4 is a section on the line 4—4 of Fig. 2, but drawn to a larger scale. Fig. 5 is a section on the line 5—5 of Fig. 2 but drawn to a larger scale. Fig. 6 is a section on the line 6—6 of Fig. 1 but drawn to a larger scale.

Referring to the drawings, there is shown in Figs. 1 and 2 a block 1 which may be taken as indicative of a meat block such as may be found in retail meat markets. At any convenient point there is provided a prime mover shown in the drawings as an electric motor 2, which may be carried by a shelf 3 at a point adjacent to the meat block, but the location of the motor is not material to the present invention. The motor 2 may be of any appropriate form and specific description of the motor is unnecessary. The motor is fed by a power circuit indicated by the conductors 4 with an interposed switch 5 whereby the motor may be cut out from the power circuit irrespective of other control to be described.

The body of the machine comprises an angle frame 6 having two members 7, 8 at substantially right angles one to the other, although any special angular relation is not mandatory. The frame 6 may be in the form of a hollow casing open on the face which, as will hereinafter appear, is directed toward the meat block. At the junction of the two members 7 and 8 the casing is enlarged to form a chamber 9, and at the ends of the members 7 and 8 remote from their point of junction the casing is also enlarged to form chambers 10 and 11, respectively. The chamber 9 has lodged therein a sprocket wheel 12, the chamber 10 has lodged therein a sprocket wheel 13 and the chamber 11 has lodged therein a sprocket wheel 14, each of these wheels being provided with peripheral series of teeth 15 preferably to one side of the center line of the periphery of the wheel. The several sprocket wheels 12, 13 and 14 are designed to carry an endless band saw 16 having one edge 17 formed with cutting teeth, while near the other edge the saw has an endless series of perforations 18 adapted to the teeth 15 of the several sprocket wheels, which latter have their peripheries extended axially and are cylindrical to properly engage and support the saw, the latter in the particular instance shown being wider than the periphery of the wheels, so that the toothed edge 17 may extend beyond the plane of what in operation constitutes the lower edge of the wheel, and the wheels are so mounted that this toothed edge 17 of the saw will project slightly beyond the lower edge of the frame 6 in order that when acting upon meat it may cut through bone directly engaging the upper face of the block 1, the several terms of position used being with relation to the operative positions of the structure.

The sprocket wheel 12 is shown in detail in Fig. 3. This wheel is formed with a hub 19 divided into two chambers by an internal flange 20. In one of these chambers there is lodged a cup 21 for a series of anti-friction balls 22, and in the other chamber there is lodged a cup 23 for a like series of balls 24. Extending through the hub 19 and carrying the wheel 12 is an arbor 25 formed with an annular shoulder 26 coacting with the cup 21 to confine the balls 22. The end of the arbor 25, which in practice constitutes the lower end, is provided with a shoulder beyond which projects a threaded stem 27 for the reception of a nut 28 shaped to coact with the cup 23 to confine the balls 24. The ring 28 is an adjustable member, whereby the ball bearings may be brought into proper relation one to the other and to the wheel 12; and this nut also serves to sustain the wheel 12. The other end of the arbor 25 has a plain extension 29 beyond the shoulder 26 and is then formed with a threaded extension 30 and a reduced threaded stem 31. The plain extension 29 extends through an elongated slot 32 formed in the top of the casing of the chamber 9 intermediate of and parallel with two parallel guide ribs 33. These guide ribs confine between them a guide plate 34 into which the threaded portion 30 of the arbor 28 is screwed, and a lock nut 35 and washer 36 applied to the threaded stem 31 serves to lock the arbor to the plate 34 against accidental displacement. At one end of the plate 34 there is a threaded stem 37 extending through a perforation in an ear 38 uprising from the frame 6 at the angle between the two guide ribs 33, and a thumb nut 39 applied to the stem 37 provides a means for the adjustment of the plate 34 in the direction of the length of the guide ribs 33, this direction of adjustment being perpendicular to the run of the saw blade 16 between the two rollers 13 and 14, the usual runs of the saw blade being from the respective rollers 13 and 14 from and toward the roller 12. The roller 12 with its carrying means constitutes a tightening device for the saw blade, whereby the saw blade may be maintained in the desired taut condition, but when it is necessary to remove the saw blade, as for sharpening, the tightening device may be loosened up sufficiently to permit the removal of the saw from the sprocket wheels.

The roller 14 is like the roller 12 and is similarly mounted, except that it is provided with an arbor 25$^a$ having a plain extension 29$^a$ continued into a threaded stem 31$^a$ to which is applied a nut 35$^a$ directly engaging the portion of the casing covering the chamber 11, so that the arbor is locked firmly in place. The ball bearing structure of the roller 14 is otherwise like that of the roller 12 and the same description will apply.

The roller 13 has its hub keyed or otherwise secured to one end of a short shaft 40 extending through the bore 41 of a post 42 rising from the top of the chamber 10. This bore is enlarged adjacent to the roller to receive a ball cup 43, while an annular shoulder 44 on the shaft 40 coacts with the cup 43 to retain anti-friction balls. The other end of the bore 41, which may be considered as the upper end, is enlarged to receive a ball cup 45 and the shaft 40 is reduced in diameter where passing through the ball cup, as indicated at 46, while a cone 47 applied to the reduced portion of the shaft coacts with the cup to retain the ball bearings and is held in place by a suitable nut 48 applied to the reduced portion of the shaft. That end of the shaft 40 remote from the sprocket wheel 14 is formed with an axial tongue 49 receiving a split terminal 50 of a flexible shaft 51, the split terminal being spread over the tongue 49 by a suitably shaped collar 52, this structure constituting an expansion coupling, and this expansion coupling is housed by a suitable casing 53 applied to the corresponding end of the post or standard 42. A flexible tube 54 is connected at one end to the casing 53 and at the other end to a similar casing 55 attached to the motor casing, and the shaft 51 may be connected to the motor armature by an expansion coupling such as has been just described. The structure described is well adapted to the purpose, but the invention is not necessarily confined to the particular details set forth, it only being necessary that the armature shaft of the motor should be connected to the wheel 13 to drive the same irrespective of the position of the casing 6 and parts carried thereby with relation to the motor.

The two enlargements at the terminal portions of the frame 6 inclosing the chambers 10 and 11 are connected together by a hollow arch bar 56 connected at one end to the post 42 and at the other end divided into two members 57, 58 with their free ends in spaced relation and connected to diametrically opposite parts of the casing to the chamber 11, the member 58 being shaped to constitute a convenient handhold. The arch bar 56 serves to stiffen the portion of the frame traversed by the run of the saw between the wheels 13 and 14, which run of the saw is the active run, and between these two wheels the saw is free and open since the frame or casing 6 is there omitted. The open condition of the particular run of the saw under consideration and the arch shape of the bar 56 permits the utilization of this run of the saw for cutting wherever a meat saw is to be employed, the cutting of bones being the function of a meat saw.

The hollow arch bar 56 is utilized for housing a suitably insulated double conductor 59, which from the arch bar is carried along the flexible tube 54 housing the flexible shaft 51 and is retained on the tube 54 by clips 60, the conducting cord 59 forming a continuation of one of the power conductors 4. The cord 59 is carried to two spaced terminal members 61—62 shown in Fig. 6, the terminal member 61 being in the form of a leaf spring movable against its normal tendency into engagement with the terminal member 62 to complete the motor circuit through the cord 59. These two terminal members are carried by but insulated from a plate 63 covering an opening 64 in the member 58 and held thereto by screws 65. The plate 63 is provided with an opening through which projects one end of a push button 66, the other end engaging the spring terminal plate 61. The push button 66 is conveniently located for manipulation by an operator grasping the member 58 which constitutes a handle member for the control of the saw with relation to the meat or bones to be severed and the construction is such that the operator may with one hand control both the meat saw as a whole and the running thereof.

The member 7 of the frame 6 has formed thereon a boss 67 and the casing of the chamber 10 has formed thereon another boss 68, these two bosses receiving rods 69, 70, respectively, which in turn enter other bosses 71 on a sleeve 72 near the ends thereof. This sleeve 72 carries near the ends ball bearings 73 embracing a rod 74 held at its ends in spaced brackets 75 made fast to the block 1. The rod 74 and the sleeve 72 carry a saw frame in such manner that the frame may be rocked about the longitudinal axis of the rod 74 or may be moved along said rod in the direction of its length, so that the active run of the saw may be brought into operative relation to any desired portion of the meat to be severed, and then may be turned about the rod 74 by a suitable manipulation of the handhold 58 to cause the cutting edge of the saw to act on the bone to be severed in a direction to pass through the bone, the saw being moved toward the surface of the block 1.

The brackets 75 are sufficiently extensive to carry other rods 76 and 77, respectively, the rod 76 being more remote from the block 1 than is the rod 74 and the rod 77 being quite close to the block and in the normal position of the parts below said rod 74. The rod 76 is provided as a stop rod for an arm 78 projecting from the sleeve 72, so that the active edge of the saw may be brought to the surface of the block 1, but will not enter the same, the movement of the saw frame being arrested by the engagement of the arm 78 with the rod 76, such position of the parts being shown in Fig. 1.

The rod 77 traverses a yoke 79 in which is mounted a roller 80 and the yoke 79 is connected by a spring 81 to the arm 78. The spring 81 is of a kind and of a strength tending at all times to hold the saw frame in an elevated position, that is, lifted away from the block 1, and this spring must be extended when the saw frame is moved actively to sever bones, whereby on the operator releasing the saw frame the spring 81 will move the saw frame to the elevated inactive position, and since the motor circuit is only closed at the volition of the operator by pressing the push button 66, the release of the saw frame from the control of the hand of the operator also causes the rupture of the motor circuit at the push button and the stopping of the motor, which, of course, results in the stopping of the saw.

Since in the operation of cutting the saw is moved toward the block 1, there is a tendency to force the saw in a direction toward the arch bar 56. To overcome this tendency the terminal casings inclosing the chambers 10 and 11 are each formed adjacent to the point where the free run of the saw begins or terminates, as the case may be, with an offset 82 housing a roller 83 held by a pin 84 constituting its arbor, said pin having a threaded portion 85 extending through one wall of the offset, while the other end of the pin is inset into the other wall of the offset. This roller bears upon the upper edge of the saw, that is the edge remote from the toothed edge, so that where the saw leaves one sprocket wheel, say the wheel 13, and where it passes to the other sprocket wheel, say the wheel 14, the saw is prevented by the rollers from being moved out of proper relation to the teeth of the sprocket wheel and, therefore, these teeth will surely engage the perforations 18 to properly drive and support the saw.

The saw is placed under such tension as may be best adapted for its proper operation by a suitable manipulation of the nut 39, and the whole structure having been moved into proper relation to the meat or bone to be cut, this movement being permitted by the sliding and rocking action of the sleeve 72 on the rod 74 and the flexibility of the shaft 51 and tube 54, the operator moves the saw toward the block 1 without attempt at progressive movement along the block and at the same time presses the button 66, thus starting the motor which acts through the flexible shaft 51 upon the arbor 40 in turn imparting rotative movement to the sprocket wheel 13 and the rotation of the sprocket wheel 13 imparts motion to the saw in the proper direction, the other two sprocket wheels acting simply as idlers. By applying sufficient force to depress the saw frame against the normal tendency of the spring 81 the saw is brought into engagement with the bones to be cut and as the cutting progresses the saw may be lowered until ultimately the bone is severed, when the saw may be released and will return by action of the spring 81 to the normal elevated position, the release of the push button 66 having in the meantime ruptured the motor circuit and stopped the motor. The device enables a meat cutter to very quickly sever bones with the expenditure of so little force on the part of the operator as to be unnoticeable and without the fatigue and time usually incident to the severing of bones with hand saws. Furthermore, the bone is severed in a plane perpendicular to the surface of the block whether or not the operator be skilled in the handling of meat saws. The rollers 83 are of particular value when the saw is doing heavy work, the tension of the saw being usually sufficient to maintain it in proper position when cutting against comparatively slight resistance.

What is claimed is:—

1. A meat sawing machine including a band saw, a hollow substantially V-shaped saw carrying frame composed of two members joined at one end at the angle of the frame, said frame being closed at the top and open at the bottom and having pulleys mounted within it at the angle and ends of the V-shaped frame and receiving and forming a guard for two runs of the band saw and exposing the other or active run of the band saw at the unjoined ends of the said members, and an arched bar connecting the unjoined ends of the saw carrying frame above the plane of the active run of the band saw.

2. A meat saw including a fixed guiding frame having inner upper and lower horizontal rods and an outer horizontal rod, a sleeve slidable on the upper horizontal rod and provided with an outwardly projecting arm extending beneath and having its upward movement limited by the outer horizontal rod, a spring slidably connected with the lower inner rod and secured to the said arm, and a saw carrying frame connected to the sleeve and slidable longitudinally of the guiding frame and adapted to swing upwardly and downwardly.

In testimony, that we claim the foregoing as our own, we have hereto affixed our signatures in the presence of two witnesses.

ALLEN S. ERQUHART.
CYPRIEN DUCLOS.

Witnesses:
A. L. SHAW,
W. M. L. RIGSBEE.